June 29, 1948.  G. A. LYON  2,444,052
WHEEL TRIM RING
Filed Nov. 1, 1943
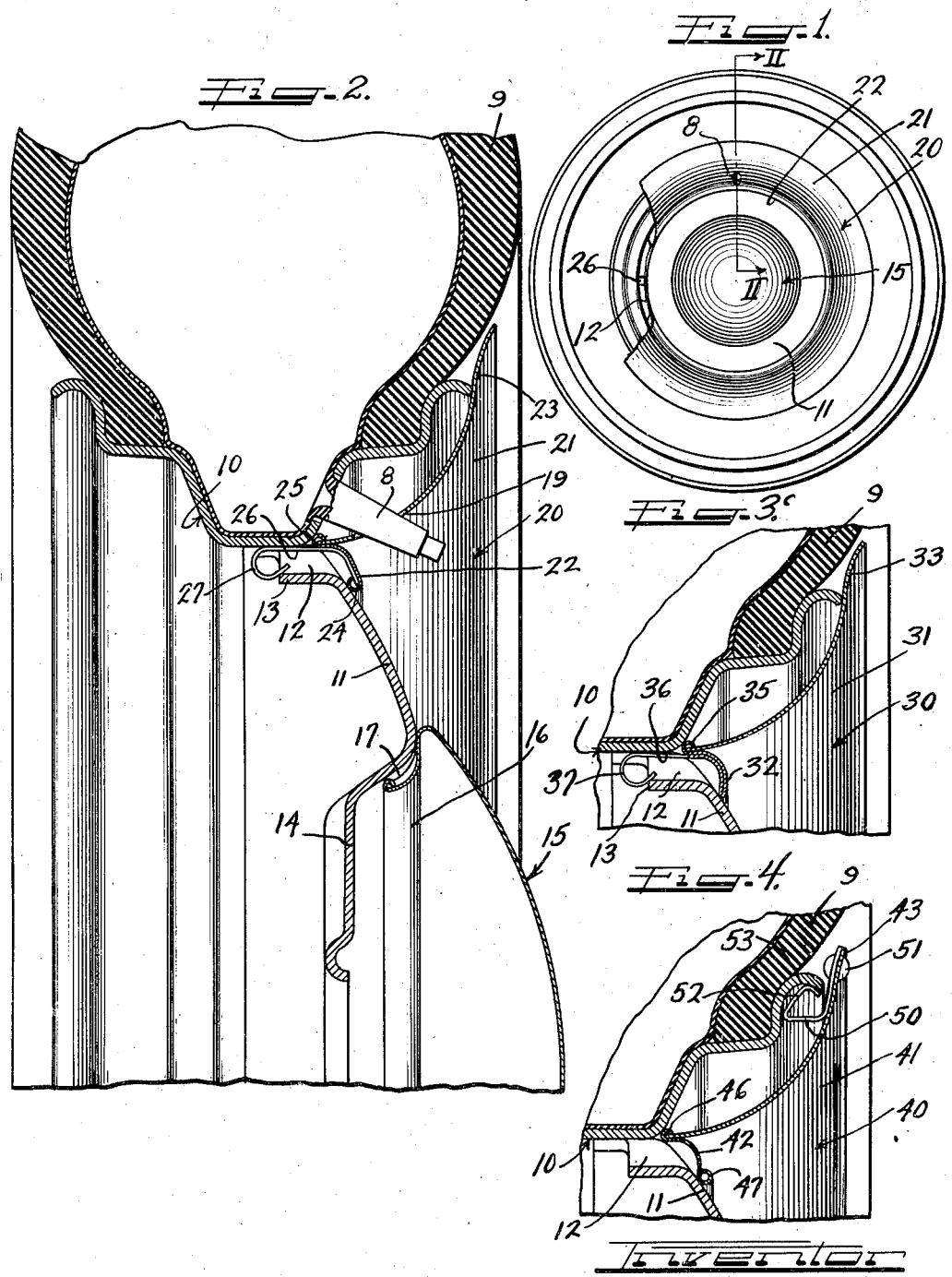
Inventor
GEORGE ALBERT LYON.

Patented June 29, 1948

2,444,052

UNITED STATES PATENT OFFICE 2,444,052

WHEEL TRIM RING

George Albert Lyon, Allenhurst, N. J.

Application November 1, 1943, Serial No. 508,465

12 Claims. (Cl. 301—37)

This invention relates to a wheel structure, and more particularly to a snap-on detachable cover for a wheel.

An object of this invention is to provide an improved and simplified form of wheel cover which will give a more symmetric appearance to a wheel.

Another object of this invention is to provide a combination plastic and metal cover having opposed convexly curved annular portions so arranged as to cover irregular recesses and indentures in the wheel, whereby the wheel will have a more symmetric appearance.

A still further object of this invention is to provide a novel structure for retaining the wheel cover on the wheel.

In accordance with the general features of this invention there is provided in a wheel structure including a multiflange tire rim and body members joined together at spaced points at the base flange of the rim member and leaving openings between the members, an annular trim member for disposition over the flanges of the rim member, having an outer edge terminating adjacent the tire on the rim and an inner edge terminating at the base flange of the rim member, a second ornamental member for concealing the openings in the wheel and interlocked with the inner edge of the trim member, and means on one of these ornamental and trim members for retaining the same on the wheel.

A still further feature of the invention relates to the provision of a novel article of manufacture in the form of a wheel cover having concentric but opposed annular trim rings interconnected together for covering rim flanges and spider openings of a wheel and also provided with novelly arranged retaining means for holding the same on the wheel.

In accordance with other features of this invention there is provided in a wheel structure of the aforementioned character a number of different forms of simplified retaining means for holding the cover structure on the wheel without necessitating any change in the construction of the existing wheel.

Other objects and features of this invention will more fully appear from the following detailed description taken in connection with the accompanying drawings, which illustrate several embodiments thereof, and in which Figure 1 is a side view of a wheel structure embodying the features of this invention and in which the outer cover ring is partly broken away to show the location of the retaining means with reference to the wheel openings;

Figure 2 is an enlarged fragmentary cross-sectional view taken on substantially the line II—II of Figure 1 looking in the direction indicated by the arrows and showing clearly the manner in which the concentric ornamental members are held on the wheel;

Figure 3 is a fragmentary cross-sectional view similar to Figure 2 illustrating a modified form of retaining means; and Figure 4 is a fragmentary cross-sectional view similar to Figure 3 illustrating still another form of retaining means for holding my multiple-ring cover on the wheel.

As shown on the drawings:

The reference character 9 designates generally a conventional type of tire with the usual pneumatic tube and a valve stem 8. This tire is mounted in the usual way upon a drop center multiple flange tire rim 10 which is now well known in the art. Fastened at spaced intervals to the base flange of the tire rim is the usual wheel body or load bearing member 11 which preferably comprises a metallic stamping as is also known in the art. The wheel body member 11 may be attached by any suitable means such, for example, as by rivets or welding to the base flange 10, the points of attachment being separated by what is called wheel openings 12 defined by indented flange portions 13 in the wheel body or spider member. These openings are sometimes provided to cause the spider to simulate spokes, and at other times are provided to perform the purpose of ventilation openings.

The central portion of the wheel spider or body member 11 is indented and formed into a flange 14 which is used to attach the wheels by means of bolts or cap screws (not shown) to a wheel axle or support as is well-known in the art. The central dished portion of the spider 11 is also provided with a plurality of spaced bumps or protuberances 17 which constitute the retaining means for holding a hub cap 15 in position over the central dished portion of the wheel spider. This hub cap 15 has a continuous rearwardly extending skirt 16 which is adapted to be resiliently snapped over the bumps 17 in a manner that is now well-known in the art.

My invention particularly concerns itself with the rim flanges of the wheel as well as with the openings and is directed to providing a cover structure for the same which will give the wheel a more symmetric appearance and effect than is possible when the openings and the flanges are exposed to view. One form of the cover of my invention is shown in Figures 1 and 2 and is designated generally by the reference character 20. It embraces an outer annular trim ring 21 and an inner annular trim ring 22 which are connected together as I shall hereinafter describe so that the cover is a unitary device.

The outer peripheral portion of the ornamental trim ring 21 of the cover is formed into a lip 23 which extends beyond the rim to a position adjoining the tire 9. This feature, together with the convex curvature of the ring section 21 enables that section to appear to follow the curvature of the tire. In other words, this trim ring section 21 appears to be a continuation of the side wall of the tire, and when it is given a light external appearance, in fact appears to constitute a white side wall part of the tire.

I preferably make this ring section 21 of a resilient pliable material such as a synthetic plastic so that it may be flexed manually and yet may spring back to its original contour after each flexure or indentation of the same. Excellent results may be attained by making this ring section 21 out of ethyl cellulose.

The inner trim ring 22 is of lesser depth than that of the ring 21 since it is only necessary for it to cover the wheel openings 12. It has a convex curvature and is disposed in opposite facing relation to the curved outer surface of the ring section 21. In fact, a part of the curved outer surface of the ring section 22 is contiguous with the curved outer surface of ring 21 as is evident from Figure 2. This ring section 22 is interlocked to the section 21 by means of a curled bead 25 on the outer peripheral edge of the ring section 22. In other words, the outer edge of the section 22 is curled around the inner edge of the section 21 so as to interlock the two together and thus form a unitary device.

I preferably make the section 22 of a more rigid material than the section 21, and excellent results may be obtained by making the section out of a sheet metal such, for example, as stainless steel sheet. Such a construction will be found to be advantageous in that it rigidifies the plastic section 21 at its inner margin and provides a rigid, stable base for the section 21.

Before proceeding with the description of the retaining means for the cover, I desire to call attention to the fact that the outer section 21 may be provided with an opening 19 through which the valve stem 8 may project in the event that the valve stem is of such a length that it is necessary for it to project out of the section 21. Should the valve stem be of a shorter length, then this opening may be dispensed with and access may be had to the valve stem by flexing the outer margin of the highly resilient section 21. In other words, the lip 23 may be manually gripped to pull the outer portion of the section 21 away from the wheel to an extent sufficient to afford access to the rear side thereof. Such access is, of course, necessary when it is desired to pry the cover loose from the wheel, at which time a suitable tool, such as a screw driver, may be inserted behind the section 21 and engaged with the relatively rigid bead 25 for the purpose of exerting a pry-off force to release the cover from the wheel.

The inner edge of the more rigid and inner section 22 is formed into a curled bead 24 in which is locked a plurality of rearwardly projecting spring clips 26 which constitute the retaining means for holding my cover on the wheel. Each of these clips is of a length sufficient to enable it to extend through the wheel opening 12, and each has a curled goose-neck like free extremity 27 adapted to resiliently engage the inner edge of the indented flange 13 of the wheel spider 11.

In applying the cover to the wheel, it is first lined up with the valve stem and then it is pressed axially home so that the clips 26 are caused to pass into the wheel openings 12. In this operation, the goose-necks 27 are compressed slightly between the flanges 13 of the wheel spider and the base flange of the rim until such time as they reach the rear extremity of the flanges 13, when they will be in retaining position and backed up by the base flange of the rim. The prying off of my cover has already been previously described.

In Figure 3 I have illustrated a modification of the invention wherein the wheel structure comprising the wheel itself is the same as the wheel in Figure 1, and hence I have used the same reference numerals to designate parts of the wheel common to the two figures. In this modification of the invention, the wheel cover is designated generally by the reference character 30 and embraces a plastic section 31 similar in material and action to the ring section 21. This plastic annular section 31 has a flexible outer lip portion 33 which is curved slightly away from the tire 9, but is still sufficiently close to the tire that the section appears to blend into the side wall of the tire, as is true of the section 21.

In addition, the wheel cover 30 also embraces an inner annular metallic ring 32 which is similar to the ring 22 but differs from ring 22 in that it has formed integral with it the retaining fingers 36. As in the first form of the invention, these fingers are spaced circumferentially about the inner edge of the cover and are disposed for register with and entry into the wheel openings 12. The metal annular ring 32 has an outer edge curled at 35 about the inner edge of the outer ring 31 so as to interlock the two rings and thus form a unitary device. The inner marginal portion of the ring 32 is folded back upon itself so as to form a double thickness of material as is shown, and the rearmost extremity of this portion has cut from it the fingers 36, each of which has a curled or goose-neck free extremity 37. The goose-neck extremity 37 functions in the same manner as the extremity 27 on the fingers 26 of the first form, with the exception that the fingers are actually cut from the inner edge of the metal ring 32.

In Figure 4 I have illustrated still a further form of the invention wherein the parts of the wheel are designated by the same numerals as in Figures 2 and 3. In this form of the invention, the wheel cover is designated generally by the reference character 40 and comprises an outer plastic section 41 and an inner metal ring 42 interlocked together at 46 by a curled edge on the inner metal ring. The metal ring 42 also has an inner curled edge 47 adapted to seat against the spider 11 adjacent, but slightly radially inward, of the openings 12.

The outer marginal portion of the annular plastic ring 41 is formed into a lip 43 disposed adjacent the side wall of the tire beyond the rim and which marginal portion has secured to it a plurality of retaining spring clips 50. These clips are made of metal and may be fastened to the edge of the ring section 41 by any suitable means much, for example, as by rivets 51. Each of these clips 50 comprises a strip of spring material which extends radially inwardly and then is turned back upon itself into an angular bent extremity 52 adapted to be cammed into resilient engagement with the undercut edge 53 of the outermost flange of the tire rim 10. In other words, the extremities of these clips 50 are normally arranged in a circle which is of a slightly greater diameter than the undercut surface 53 so as to require flexure of the extremities 52 as the cover is pressed axially home into retained position.

In the forms of the invention shown in Figures 2 and 3, the cover is adapted to be removed by a pry-off tool inserted behind the cover and engaged with the beaded edge 25—35 for the purpose of forcibly prying the fingers out of retaining engagement with the wheel. In the form of the invention shown in Figure 4, the cover may be removed by pulling on the outer edge 43 of the cover so as to release the spring clips 50. If necessary a pry-off force can be applied to the outer edge by applying the force directly to one of the spring clips by means of a screw-driver or the like. However, the tension of these clips 52 can be so adjusted that the cover can be removed by manually pulling it free of the wheel.

I claim as my invention:

1. In a wheel structure including multiflange tire rim and body members joined together at spaced points at the base flange of the rim member and leaving openings between said points, an annular trim member for disposition over the flanges of said rim member having an outer edge terminating radially beyond the rim member and an inner edge terminating at the base flange, a second ornamental member for concealing said openings and interlocked with the inner edge of said trim member, and means on one of said trim and ornamental members for retaining them on the wheel, said trim member being made from resiliently flexible synthetic plastic material on the order of ethyl cellulose which is manually deflectable but springable back to its original contour after deflection so that it is resistant to permanent deformation, said ornamental member having an annular portion abutting and reinforcing a marginal area of said trim member beyond the juncture of the members for relieving the trim member from bending strains.

2. In a wheel structure including multiflange tire rim and body members joined together at spaced points at the base flange of the rim member and leaving openings between said points, an annular trim member for disposition over the flanges of said rim member having an outer edge terminating radially beyond the rim member and an inner edge terminating at the base flange, a second ornamental member for concealing said openings and interlocked at its outer edge with the inner edge of said trim member, and means on said second ornamental member for retaining the assembled members on the wheel, said retaining means comprising a plurality of spaced spring clips interlocked with the inner edge of said ornamental member and arranged to project into the wheel openings for snap-on retaining engagement with the body member.

3. In a wheel structure including multiflange tire rim and body members joined together at spaced points at the base flange of the rim member and leaving openings between said points, an annular trim member for disposition over the flanges of said rim member having an outer edge terminating radially beyond the rim member and an inner edge terminating at the base flange, a second ornamental member for concealing said openings and interlocked at its outer edge with the inner edge of said trim member, and means for retaining the assembled members on the wheel, said retaining means comprising a plurality of spaced extensions formed from the inner edge of said ornamental member and having free extremities formed into resilient loops adapted to enter the wheel openings and formed for resilient detachable snap-on engagement with the wheel body member in the openings.

4. In a wheel structure including multiflange tire rim and body members joined together at spaced points at the base flange of the rim member and leaving openings between said points, an annular trim member for disposition over the flanges of said rim member having an outer edge terminating radially beyond the rim member and an inner edge terminating at the base flange, a second ornamental member for concealing said openings and interlocked with the inner edge of said trim member, and means on one of said trim and ornamental members for retaining them on the wheel, said retaining means comprising a plurality of resilient clips secured to the outer marginal edge of the trim member for snap-on detachable retaining engagement with an outer flange of said tire rim member.

5. As an article of manufacture, a wheel trim structure comprising an outer annular trim ring of convex-concave cross-sectional contour and an inner trim ring likewise convexly curved but in a direction toward the outer surface of the outer ring so that portions of the outer surfaces of the two rings are contiguous, an outer edge of said inner trim ring being attached to the inner edge of the outer trim ring, and one of said trim rings being provided with means for detachably retaining the trim structure on a wheel, said inner trim ring having its inner edge folded back upon itself to provide a double thickness and also having projected from the extremity of the edge a plurality of fingers for retaining cooperation with the wheel and which constitute the aforesaid detaining means.

6. As an article of manufacture, a wheel trim structure comprising an outer annular trim ring of convex-concave cross-sectional contour and an inner trim ring likewise convexly curved but in a direction toward the outer surface of the outer ring so that portions of the outer surfaces of the two rings are contiguous, an outer edge of said inner trim ring being attached to the inner edge of the outer trim ring, and one of said trim rings being provided with means for detachably retaining the trim structure on a wheel, said retaining means comprising a plurality of spaced resilient fingers interlocked with an inner edge of said inner trim ring.

7. In a wheel structure including tire rim and body members joined together at spaced points at the base flange of the rim member and leaving openings between said points, a first annular trim member for disposition over the rim member with its outer edge terminating adjacent to the edge of the rim member and an inner edge terminating adjacent to said base flange, a second annular trim member for concealing said openings and interlocked at its outer edge with the inner edge of said first trim member, and a plurality of spaced spring clips extending fixedly from the inner edge of said second trim member to adjacent the junction of the two trim members and thence axially inwardly beyond said junction to project into the wheel openings for snap-on retaining engagement with the wheel.

8. In a wheel structure including tire rim and body members joined together at spaced points at the base flange of the rim member and leaving openings between said points, a first annular trim member for disposition over the rim member with its outer edge terminating adjacent to the edge of the rim member and an inner edge terminating adjacent to said base flange, a second trim member for concealing said openings and interlocked at its outer edge with the inner edge of said first trim member, and spring clips in reinforcing relation to the inner side of said second trim member hugging the latter to the junction thereof with the first trim member and extending in an axial direction beyond the junction to project into the wheel openings for retaining engagement with the wheel.

9. A wheel trim structure comprising an outer annular trim ring adapted to be concealingly disposed over the outside of a tire rim on a wheel and being of such dimension relative to such tire rim that the inner edge of the trim ring comes in assembly at approximately the base of the tire rim, an inner trim ring having its outer edge interlocked with the inner edge of the outer trim ring and being formed with a substantially radially facing shoulder engaging opposed face of the inner margin of the outer trim ring adjacent to the juncture, said outer trim ring being made from a resiliently pliable material adapted to be manually flexed but springable back to its original shape on being released and in such flexure being backed up by said shoulder, and retaining means carried by said inner trim ring and projecting axially inwardly beyond said juncture for attaching the cover to the wheel adjacent to the base of the tire rim.

10. A cover construction for application to a wheel including a tire rim and a weight-sustaining body portion connected together in a manner to provide spaced openings at the base of the tire rim, an outer annular cover member constructed and arranged to be disposed in concealing relation to the outer side of the tire rim, said outer cover member being formed from a resilient pliable material adapted to be manually flexed to an extent sufficient to afford access to the rear side thereof and then spring back to its original shape, an inner cover member having its outer edge portion curled about the inner edge of said outer cover member for securing said members permanently together and being formed with a shoulder adjacent to the juncture of the members opposing the adjacent margin of the outer member to provide a flexure base for said margin when said outer member is manually flexed and thereby save the engaged edge portion of the outer member from undue stress by a substantial distribution of the bending strain, and retaining clips carried by said inner member for attaching the cover assembly to the wheel by protrusion of said clips through said openings, said clips having portions thereof in reinforcing relation to said shoulder.

11. A wheel trim assembly comprising an outer annular trim ring adapted to be concealingly disposed over the outer side of a tire rim on a wheel and being of such dimension relative to the tire rim that the inner edge of the trim ring comes in assembly adjacent to the base of the tire rim, an inner retaining ring assembled with the inner edge of the trim ring and being formed with a portion engaging the opposed face of the inner margin of the trim ring adjacent to the juncture of the rings, said trim ring being made from a resiliently pliable material adapted to be manually flexed but springable back to its original shape on being released and in such flexure being backed up by said engaging portion of the retaining ring, and means carried by the assembly and projecting therefrom in concealed relation therebehind for engagement against the tire rim in attaching the cover to the wheel.

12. A wheel trim assembly as defined in claim 11 and further characterized in that the retaining ring has the inner margin thereof smoothly finished and is of a generally convex cross section with the trim ring engaging and backing portion thereof being in the form of a radially outwardly facing shoulder merging with the remainder of the retaining ring on a relatively small radius.

GEORGE ALBERT LYON.

REFERENCES CITED

The following references are of record in the file of this patent:

UNITED STATES PATENTS

| Number | Name | Date |
|---|---|---|
| 1,234,307 | Pugh et al. | July 24, 1917 |
| 1,743,074 | Roth | Jan. 7, 1930 |
| 1,968,076 | Goodyear et al. | July 31, 1934 |
| 1,993,061 | Hunt et al. | Mar. 5, 1935 |
| 2,135,757 | Lyon | Nov. 8, 1938 |
| 2,157,960 | Lyon | May 9, 1939 |
| 2,279,331 | Lyon | Apr. 14, 1942 |
| 2,279,704 | Davenport | Apr. 14, 1942 |
| 2,368,254 | Lyon | Jan. 30, 1945 |